April 12, 1966
D. R. WHITNEY
3,245,148
ROUNDNESS GAGE
Filed July 26, 1960
2 Sheets-Sheet 1
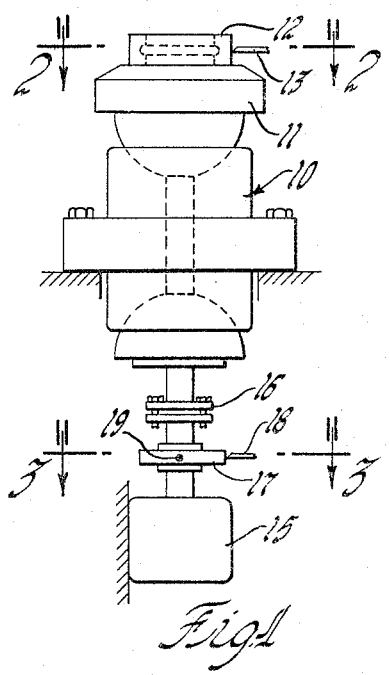
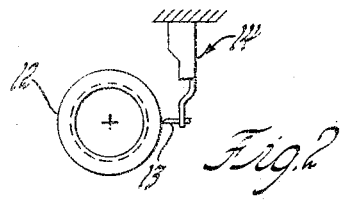
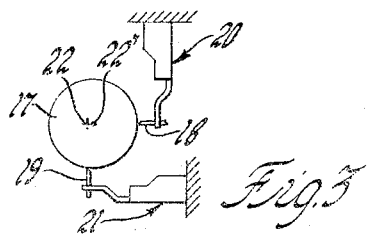
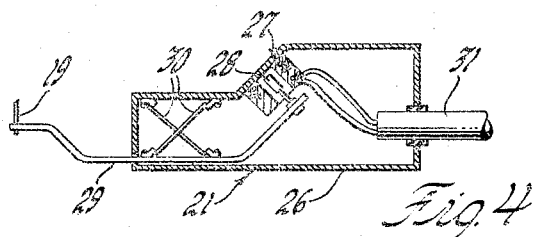
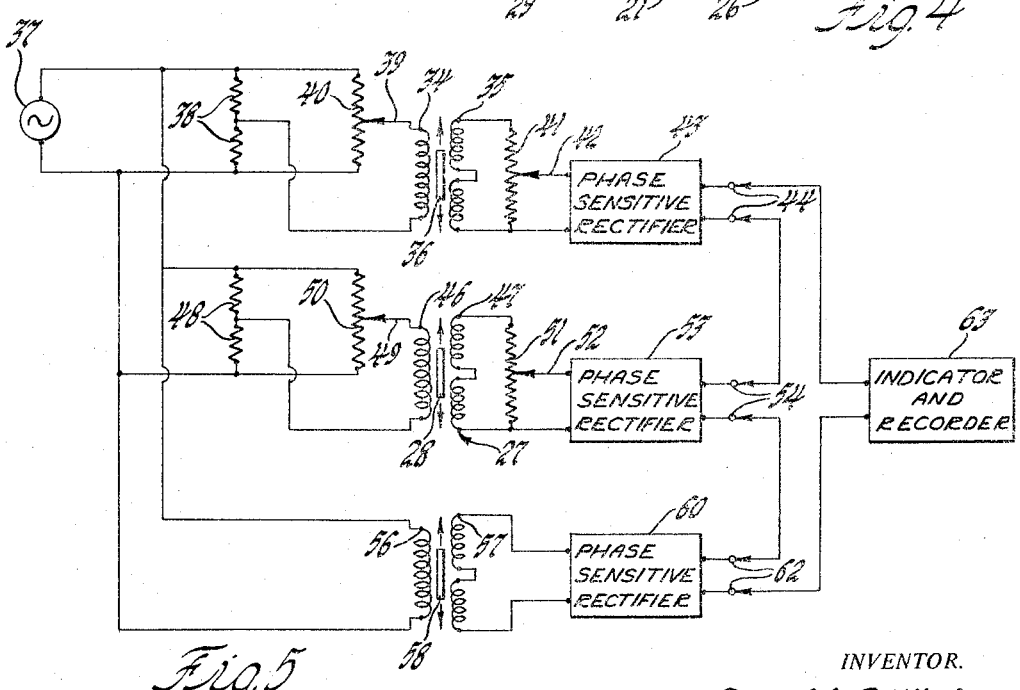
INVENTOR.
Donald R. Whitney
BY
Paul J. Ethington
ATTORNEY INVENTOR.
Donald R. Whitney
BY
Paul J. Ethington
ATTORNEY United States Patent Office 3,245,148
Patented Apr. 12, 1966

3,245,148
ROUNDNESS GAGE
Donald R. Whitney, Detroit, Mich., assignor to General Motors Corporation, Detroit, Mich., a corporation of Delaware
Filed July 26, 1960, Ser. No. 45,381
3 Claims. (Cl. 33—174)

This invention relates to roundness testing apparatus and more particularly to a roundness tester adapted to compensate for the effect of the workpiece being off-center.

A conventional method of determining whether a circular part is truly round is to rotate the part about its exact center while a displacement pickup bears upon the periphery of the part. So long as the part is rotated precisely about its center, there will be no output from the displacement pickup if the part is perfectly round, and any pickup output will be related to the departure from true roundness. However, if it is desired to test parts on a production basis, such as in quality control of the inner and outer rings of ball bearings prior to assembly, then the requirement of precisely centering each part for the test is awkward and time consuming.

It is therefore the principal object of this invention to provide improved roundness testing apparatus. Another object is to provide a roundness tester wherein it is not necessary to physically center the part prior to the test.

In accordance with this invention, apparatus is provided to rotate the circular part about its approximate center. A displacement pickup is fixed in position to bear upon the periphery of the part as it rotates. This pickup is adapted to produce an electrical output related to its radial displacement. The output will include a component due to the eccentricity of the part which will be at the frequency of rotation. If the part is out-of-round, the output will also include components which are harmonics of the rotation frequency and the latter components are the desired output. In order to eliminate the fundamental component, or to compensate for an off-center condition, apparatus is provided for generating a pair of alternating electrical signals of the fundamental frequency which are displaced in phase relative to one another. By selecting the proper amplitude and polarity of each of these signals, then a resultant signal can be obtained which is exactly equal to the fundamental component in the pickup output. If this resultant is combined in a subtractive relationship with the pickup output, then the combined signal will contain only the harmonics or the components due to out-of-roundness. This composite signal can then be indicated or recorded as a true measure of out-of-roundness.

In one embodiment of this invention, an automatic compensation feature is provided. Here the pickup output is combined with one of the alternating signals and the sum is reversed in polarity at half-cycle intervals by synchronous rectification. The rectified combined signal is used to drive a servo device which varies the amplitude and polarity of the alternating signal which was fed into the input. In a like manner, the pickup output is combined with the other alternating signal and the sum is also synchronously rectified at half-cycle intervals which are spaced by 90° from the other reversing points. This output is likewise used to drive a servo arrangement which controls the magnitude and polarity of the corresponding alternating signal to reduce the combined signal to an average of zero. The action of both of the servo arrangements produces a composite output which contains no fundamental component.

The novel features which are believed characteristic of this invention are set forth in the appended claims. The invention may best be understood by the following description of illustrative embodiments thereof, when read in conjunction with the accompanying drawings, in which:

FIGURE 1 is an elevation view of a portion of the roundness testing apparatus which incorporates principal features of this invention;

FIGURE 2 is a plan view taken through section 2—2 of FIGURE 1;

FIGURE 3 is a plan view taken through section 3—3 of FIGURE 1;

FIGURE 4 is a view partly in section of one of the pickup devices utilized in this invention;

FIGURE 5 is a schematic diagram of an electric circuit employed in conjunction with the apparatus of FIGURES 1, 2, and 3;

Figure 6:
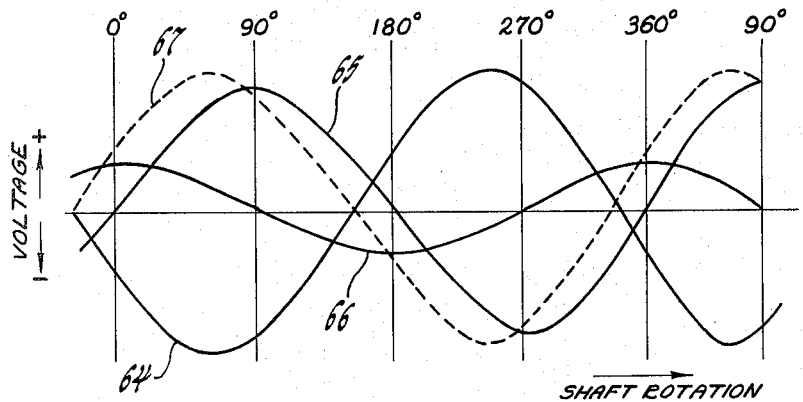
FIGURE 6 is a graphic representation of voltage waveforms appearing in the circuit of FIGURE 5.

With reference to FIGURE 1, there is shown apparatus for rotating a circular part about its approximate center. A spindle 10 is utilized which may be of the precision dumbbell type as set forth in my U.S. Patent No. 2,919,960, assigned to the assignee of the present invention. Engaging the spindle 10 is a chuck 11 which may be of the magnetic type adapted to hold a circular part 12. If, for example, the part 12 is an outer ring of a precision ball bearing, it may be desired to determine whether the outer diameter of the outer ring is perfectly circular. A stylus 13 of a pickup device 14 is positioned to bear upon the periphery of the part 12, as shown in FIGURE 2. The dumbbell spindle 10 is driven by an electric motor 15 through a suitable flexible coupling 16 which insures that wobble of the motor shaft is not transmitted to the spindle shaft. A circular cam 17 is mounted in the drive unit at some point between the motor 15 and the part 12, such as below the flexible coupling 16. Bearing upon the periphery of this cam 17 are a pair of styli 18 and 19 of a corresponding pair of displacement pickup devices 20 and 21 which are fixed in position. As shown in FIGURE 3, the styli 18 and 19 bear upon points at 0° and 90°, respectively, when the stylus 13 is considered to be at 0°. The physical center 22' of the circular cam 17 is displaced from the center of rotation 22 of the cam by a considerable distance.

The displacement pickup devices 14, 20, and 21 may all be of the same form and each is adapted to produce an electrical output related to linear movement of the appropriate stylus. For example, a pickup assembly as shown in FIGURE 4 may be utilized. This assembly, designated to be the pickup device 21, includes a housing 26 to which is attached a linear variable differential transformer 27. A core 28 is arranged to move within the coil of the transformer 27 in accordance with the displacement of the stylus 19. The stylus 19 is fixed to one end of a pivoted member 29 and the core 28 is supported at the other end. The member 29 is pivoted by a pair of crossed spring members 30. One end of each spring member is fixed to the casing 26 while the other end of each member is fixed to the member 29. The leads to the transformer 27 are brought out through the casing 26 by a suitable electric cable 31.

With reference to FIGURE 5, there is shown an electrical circuit for obtaining displacement signals from the differential transformers in the pickup devices 14, 20, and 21. The linear variable differential transformer which is enclosed in the pickup device 20 includes a primary 34 and a secondary 35. A core 36 is positioned to move between the primary and secondary in accordance with the displacement of the stylus 18. The primary 34 is excited from an alternating voltage source 37 which has a frequency of about 2,400 c.p.s. One side of the primary 34 is connected to the juncture of a pair of like resistors 38 while the other side is connected to a movable tap 39 on a potentiometer 40. The resistors 38 and the potentiometer 40 are connected in parallel across the source 37. With this arrangement, the primary 34 may be excited by a high frequency signal of variable amplitude which is either in phase with the source 37 or 180° out of phase, depending upon the setting of the tap 39. The secondary 35 of the transformer is connected across a sensitivity adjustment potentiometer 41 and a portion of the output of this potentiometer, as selected by a movable tap 43, is applied to a phase sensitive rectifier 43. This rectifier 43 may be of the conventional diode-bridge type and is adapted to produce a direct voltage at a pair of output terminals 44 which is related in magnitude and polarity to the amplitude and phase of the output of the differential transformer. It is seen that the voltage appearing at the terminals 44 will be dependent upon both the displacement of the core 36 and the position of the tap 39.

Also in FIGURE 5 there is shown the differential transformer 27 which includes the core 28 and is disposed within pickup device 21 of FIGURE 4. This transformer includes a primary 46 having one side connected to the juncture of a pair of resistors 48 and the other side connected to a movable tap 49 on a potentiometer 50 so that the primary may be excited by an alternating voltage of variable amplitude and reversible phase as above. A secondary 47 of the transformer is connected across a sensitivity adjustment potentiometer 51 having a movable tap 52 and the output of this potentiometer is applied to a phase sensitive rectifier 53. The voltage produced at a pair of output terminals 54 of the rectifier is a direct voltage which varies in magnitude and polarity in accordance with the amplitude and phase of the differential transformer output.

The differential transformer in the pickup device 14 which is associated with the circular part 12 includes a primary 56 that is also excited by the source 37. The transformer includes a secondary 57, and between the primary and secondary is a core 58 which is coupled to move in accordance with the displacement of the stylus 13. The secondary 57 is connected to a phase sensitive rectifier 60 which produces a direct voltage at a pair of output terminals 62 that varies in magnitude and polarity in accordance with the differential transformer output or with the displacement of the core 58. The output terminals 62 are connected in series with the terminals 44 and 54 and this series combination is connected to the input of a recorder 63 or other voltage responsive indicating means.

For a certain amount of eccentricity of the part 12, the voltage appearing at the terminals 62 may resemble a line 64 in FIGURE 6, wherein the outputs of the three phase sensitive rectifiers 43, 53, and 60 are illustrated in graphic form. The output voltages are plotted as a function of the angular position of the part 12 or the cam 17. The high frequency transformer excitation from the source 37 has been filtered out at this point. To compensate for the eccentricity of the part 12, the voltage appearing at the terminals 44 should have a waveform resembling a line 65 while the voltage appearing at the terminals 53 should have a waveform resembling a line 66. The output of the terminals 44 and 54, being connected together in an additive relationship, produces a resultant voltage as shown by a dotted line 67 in FIGURE 6. If the amplitudes and polarities of the voltages at terminals 44 and 54 are properly selected, then the resultant voltage 67 will be exactly equal to the inverse of the line 64 or the voltage appearing at the terminals 62. Thus, it is seen that the fundamental component of the output of the pickup device 14 does not appear at the input of the recorder 63.

In the operation of the apparatus described above, the circular part 12 is rotated at the desired speed by the motor 15. A pair of compensating signals which are spaced by 90° and which alternate at the frequency of rotation are obtained from the pickup devices 20 and 21. The amplitudes and polarities of these two signals may be varied by the adjustable taps 39 and 49. The pickup 14 produces an output voltage, such as the line 64, which may include a fundamental component due to the fact that the part 12 is off-center. These three voltages are added together, and if the two compensating signals, the lines 65 and 66, are properly selected, then a resultant is produced as shown by the dotted line 67 which can cancel out the fundamental component of the line 64. In manual operation, the combined output is observed on the indicator or recorder 63, and the adjustable taps 39 and 49 are varied by hand until the recorder 63 indicates a minimum variation. The indicated signal will then include only the harmonics since the fundamental component, caused by the part being off-center, will be cancelled out.

Figure 7:
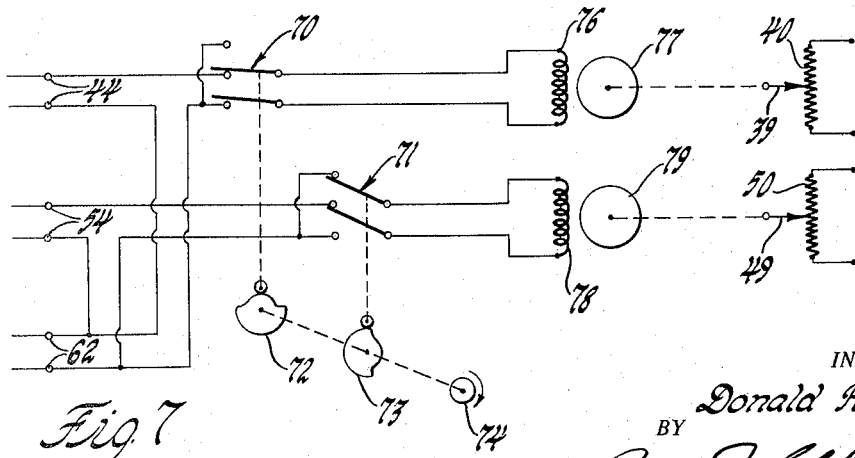
FIGURE 7 is a schematic diagram of a circuit utilized in a modification of this invention.

In the embodiment of the invention shown in FIGURE 7, apparatus is provided for automatically adjusting the taps 39 and 49 to cancel out the fundamental component of the output of the pickup 14. A reversing switch 70 is utilized having its input connected to receive the sum of the voltages appearing at the terminals 44 and 62. Likewise, a reversing switch 71 is employed which has an input connected to receive the sum of the voltages appearing at the terminals 54 and 62. The reversing switches 70 and 71 are driven by a pair of cams 72 and 73 while these cams are driven by a shaft 74 at the same rotational speed as the part 12. The shaft 74 is coupled to the shaft of the motor 14 by a convenient mechanical coupling. The cam 72 is adapted to reverse the switch 70 at 180° intervals such as at 0° and 180° of rotation. In a like manner, the cam 73 is adapted to reverse the switch 71 at 180° intervals which are displaced by 90° with respect to the reversing of the switch 70. Thus the switch 71 will reverse at 90° and 270° of rotation of the part 12. The output of the switch 70 is connected to a field winding 76 of a servo motor 77. The shaft of this motor 77 is mechanically coupled to the variable tap 39 of the potentiometer 40. In a like manner, the output of the switch 71 is connected to the field winding 78 of a reversible servo motor 79. The shaft of the motor 79 is mechanically coupled to the variable tap 49 on the potentiometer 50 of FIGURE 5.

Figure 8:
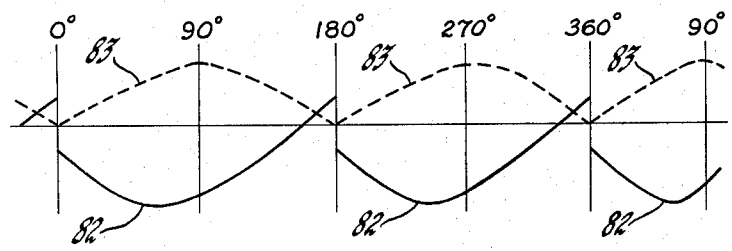
FIGURES 8 and 9 are graphic representations of voltage waveforms appearing in the circuit of FIGURE 7.
Figure 9:
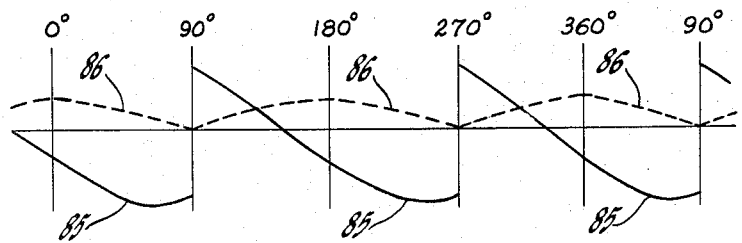

Appearing on the field winding 76 will be a voltage waveform such as shown in FIGURE 8. This waveform will include a component 82 which is the output of the pickup device 14 and will also include a component 83 which is the output of the pickup device 20. Both of these components are sinusoidal in form if the part is perfectly round. The polarities of these components are reversed at half-cycle intervals ar at 0° and 180° of the rotation of the part 12. When the average of the sum of these two components departs from zero, then the servo motor 77 will drive the tap 39 in a direction to increase or decrease the magnitude of the component 83 so as to return the average to zero. In a like manner, the voltage appearing across the winding 78 will include a component 85 as shown in FIGURE 9 which represents the output of the pickup device 14 and also a component 86 which represents the output of the pickup device 21. When the average of the sum of these two components 85 and 86 departs from zero, then the motor 79 drives the tap 49 in such a direction to reduce this sum. Thus the two components 83 and 86 are automatically adjusted to provide the required pair of alternating signals of proper amplitude and polarity to cancel out the fundamental component of the output of the pickup device 14.

In production testing, an automatic compensating arrangement as shown in FIGURE 7 would be best utilized while the part was being rotated at high speed so that the servo motors 77 and 79 would better respond to the average of the voltages applied to their field windings. However, when it is desired to record out-of-roundness on a pen-type recorder, then it is preferable to have the part rotated at a much lower speed. Thus the motor 15 may be a two-speed device, providing a high speed for compensating and a low speed for recording.

While this invention has been described in terms of illustrative embodiments, it is of course understood that various modifications may be made by persons skilled in the art. Thus it is contemplated that the appended claims will cover any such modifications as fall within the true scope of the invention.

I claim:

1. In roundness measuring apparatus, drive means for rotating a circular part, a first displacement pickup positioned to bear upon said part and adapted to produce a first signal, a circular cam connected to said drive means to rotate in synchronization with said part, second and third displacement pickups positioned to bear upon said cam at arcuately spaced points and adapted to produce second and third signals, first and second control means for varying amplitude and phase of each of said second and third signals respectively, first combining means connected to said first and second pickups and adapted to produce a first composite output representing the sum of said first and second signals, first synchronous rectification means connected to receive said first composite output, means connected to receive the output of said first rectification means and adapted to activate said first control means in response thereto, second combining means connected to said first and third pickups and adapted to produce a second composite output representing the sum of said first and third signals, second synchronous rectification means connected to receive said second composite output, and means connected to receive the output of said second rectification means and adapted to activate said second control means in response thereto.

2. In roundness measuring apparatus, drive means for rotating a circular part, a first displacement pickup positioned to bear upon the periphery of said part and adapted to produce a first signal, a circular cam connected to said drive means to rotate in synchronization with said part, second and third displacement pickups positioned to bear upon the periphery of said cam at points arcuately spaced by 90° and adapted to produce second and third signals, first and second control means for varying the amplitude and phase of each of said second and third signals respectively, first combining means connected to said first and second pickups and adapted to produce a first composite output representing the sum of said first and second signals, first synchronous rectification means connected o receive said first composite output, means connected to receive the output of said first rectification means and adapted to activate said first control means in response thereto, second combining means connected to said first and third pickups and adapted to produce a second composite output representing the sum of said first and third signals, second synchronous rectification means displaced in phase by 90° with respect to said first rectification means and connected to receive said second composite output, and means connected to receive the output of said second rectification means and adapted to activate said second control means in response thereto.

3. In apparatus for measuring roundness of a circular part, drive means for rotating said part, a first displacement pickup positioned to bear upon the periphery of said first part and adapted to produce a first signal, a circular cam connected to said drive means to rotate in synchronization with said part, second and third displacement pickups positioned to bear upon the periphery of said cam at points arcuately spaced by 90° and adapted to produce second and third signals, first and second control means for varying the amplitude and phase of each of said second and third signals respectively, first combining means connected to said first and second pickups and adapted to produce a first composite output representing the sum of said first and second signals, first switching means connected to said drive means to be reversed in polarity at 180° intervals, means connected to receive said first composite output through said first switching means and adapted to activate said first control means in response to the average value thereof, second combining means connected to said first and third pickups and adapted to produce a second composite output representing the sum of said first and third signals, second switching means connected to said drive means to be reversed in polarity at 180° intervals which are displaced by 90° with respect to said first switching means, and means connected to receive said second composite output through said second switching means and adapted to activate said second control means in response to the average value thereof.

References Cited by the Examiner

UNITED STATES PATENTS

| | | | |
|---|---|---|---|
| 2,601,447 | 6/1952 | Neff | 33—174 |
| 2,636,381 | 4/1953 | Hagg | 73—464 |
| 2,854,757 | 10/1958 | Roeger | 33—174 |
| 2,947,174 | 8/1960 | Lash | 73—464 |

ISAAC LISANN, *Primary Examiner.*